US012196324B1

(12) United States Patent
Ponnusamy

(10) Patent No.: US 12,196,324 B1
(45) Date of Patent: Jan. 14, 2025

(54) DUAL-PEAK STATIC SEAL FOR HYDRAULIC DEVICE

(71) Applicant: CATERPILLAR INC., Peoria, IL (US)

(72) Inventor: Ananda Sudhakar Ponnusamy, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/220,367

(22) Filed: Jul. 11, 2023

(51) Int. Cl.
F16J 9/20 (2006.01)

(52) U.S. Cl.
CPC ................................ F16J 9/20 (2013.01)

(58) Field of Classification Search
CPC F16J 15/02; F16J 15/021; F16J 15/022; F16J 15/025; F16J 15/06; F16J 15/062; F16J 15/10; F16J 15/104; F16J 9/20
See application file for complete search history.

(56) References Cited

U.S. PATENT DOCUMENTS

| 2,841,429 | A | * | 7/1958 | McCuistion | F16J 15/3236 |
| | | | | | 277/587 |
| 3,052,478 | A | * | 9/1962 | Horvereid | F16J 15/32 |
| | | | | | 277/648 |
| 4,819,952 | A | | 4/1989 | Edlund | |
| 5,002,290 | A | * | 3/1991 | Pernin | F16J 15/024 |
| | | | | | 277/649 |
| 5,551,705 | A | * | 9/1996 | Chen | F16J 15/024 |
| | | | | | 277/648 |
| 5,692,758 | A | * | 12/1997 | Wikstrom | F16J 15/106 |
| | | | | | 277/591 |
| 6,105,970 | A | | 8/2000 | Siegrist et al. | |
| 6,129,358 | A | | 10/2000 | Kiesel et al. | |
| 7,959,161 | B2 | * | 6/2011 | Seki | G11B 33/1466 |
| | | | | | 277/648 |
| 9,388,902 | B2 | | 7/2016 | Sueyoshi et al. | |
| 11,162,590 | B2 | | 11/2021 | Crudu et al. | |
| 2019/0120385 | A1 | | 4/2019 | Von Engelbrechten et al. | |

FOREIGN PATENT DOCUMENTS

| BR | PI0800456 | 10/2008 |
| GB | 1168508 A | 10/1969 |
| GB | 1314941 A | 4/1973 |

OTHER PUBLICATIONS

HS568-226 Polyurethane Head Gland Seals 2-1/4×0.187×1/8-C/S, The O-Ring Store Llc, 2023.
100×93.8×6.9 Polyurethane Head Seal Metric, Alleghenyyork, 2019.
Fluid Power Seal Design Guide, Parker Hannifin, Jun. 2014.
Written Opinion and International Search Report for Int'l. Patent Appln. No. PCT/US2024/033701, mailed Oct. 7, 2024 (19 pgs).

* cited by examiner

Primary Examiner — Gilbert Y Lee
(74) Attorney, Agent, or Firm — Xsensus, LLP

(57) ABSTRACT

An annular seal for use in a hydraulic device provides a static seal between two components of the hydraulic device that do not move relative to each other. The annular seal has a cross-section that is substantially M-shaped along one of an inner diameter circumferential surface of the annular seal or an outer diameter circumferential surface of the annular seal. The other of the inner diameter circumferential surface or the outer diameter circumferential surface of the annular seal includes opposite side cylindrical portions extending substantially parallel to a central axis of the annular seal with a concave central portion disposed between the opposite side cylindrical portions.

20 Claims, 6 Drawing Sheets

DUAL-PEAK STATIC SEAL FOR HYDRAULIC DEVICE

TECHNICAL FIELD

The present disclosure is directed to a static seal for a hydraulic device. In particular, the present disclosure is directed to a dual-peak annular seal disposed between two components of a hydraulic device that do not move relative to each other.

BACKGROUND

Many work machines, such as tractors, excavators, loaders, and other earth moving equipment, utilize hydraulic actuators, hydraulic motors, suspension mechanisms, or other hydraulic devices to generate the force and relative movement of various portions of the machines required to accomplish their tasks. These hydraulic devices, which include, for example, hydraulic cylinders, fluid motors, and suspension mechanisms may include two fluid chambers disposed on opposite sides of a moveable element. Pressurized fluid may be introduced into one of the fluid chambers, which causes the moveable element to move relative to a stationary or moveable component of the hydraulic device.

The moveable element is usually connected to a work implement or other machine component on the work machine through a rod or shaft. Typically, each hydraulic actuator includes a sealing arrangement that prevents the pressurized fluid from leaking from the fluid chambers of the hydraulic actuator during use. One such sealing arrangement for a hydraulic cylinder is described in U.S. Pat. No. 6,129,358, which describes a unidirectional rod sealing ring adapted to form a sealed condition.

A sealing arrangement for a hydraulic device may include an annular seal disposed, for example, in a cylinder head or a gland at a rod end of a cylinder barrel to engage the cylinder barrel, or one or more annular seals disposed between any other hydraulic cylinder components that do not move relative to each other, thereby creating a static seal. The cylinder head and/or gland at the rod end of the cylinder barrel may include one annular groove or a series of annular grooves, or counter bores, axially spaced along a radially outer circumferential surface of the cylinder head or gland, with the annular groove or grooves being configured to receive each of the annular seals and hold the annular seal in contact with a radially inner circumferential surface of the cylinder barrel. Alternatively, the annular groove or series of annular grooves may be axially spaced along a radially inner circumferential surface of the rod end of the cylinder barrel, with the annular grooves being configured to receive each of the seals.

The annular grooves in the cylinder head, cylinder barrel, or other hydraulic cylinder component, which are adapted to receive the various seals, may get damaged when the hydraulic cylinder is being used in an aggressive application, such as a hydraulic cylinder used as a boom, stick, or bucket cylinder on a machine such as an excavator, track type tractor, or large wheel loader working in an application such as mining coal, bauxite, iron ore, or other minerals. Other applications of heavy machinery in earth moving operations may also expose hydraulic cylinders used on the heavy machinery for moving various components of the machinery relative to each other and relative to a work surface, to abrasive materials that may penetrate past one or more of an array of seals positioned between various components of the hydraulic cylinder. The array of seals may be designed to prevent leakage of pressurized hydraulic fluid within the hydraulic cylinder outward between the cylinder components, as well as prevent contamination of materials from outside the hydraulic cylinder into the hydraulic fluid chamber of the hydraulic cylinder. In some applications, contaminants may collect between a sealing surface of a seal and the surface of the annular groove in the hydraulic cylinder component adapted to receive the seal. These contaminants may become imbedded into the face of the seal that engages with a face of the annular groove in the cylinder component, and relative movement between the seal with embedded abrasive contaminants and the annular groove over time during operation of the hydraulic cylinder may result in grinding away a portion of the annular groove (typically formed in a metallic material of the cylinder component) to create an unwanted step or gap adjacent the seal, which may ultimately cause failure of the seal and a leak from the hydraulic cylinder. In some embodiments of a seal arrangement in a hydraulic cylinder, a standard O-ring may be included in the annular groove along with a back-up ring (BUR). The BUR may function to prevent the O-ring seal from extruding through any gaps while under pressure. With this arrangement, if proper care is not taken when assembling the hydraulic cylinder, the BUR may get pinched or installed improperly such that the BUR or O-ring may protrude from the annular groove causing damage to one or both of the BUR and O-ring during assembly, thus leading to a defective seal and leakage of hydraulic fluid.

The various disclosed exemplary embodiments of an annular seal designed to be disposed between various hydraulic cylinder components that do not move relative to each other, are directed to solving all or some of the problems set forth above.

SUMMARY

In one aspect, the present disclosure is directed to an annular seal for use in a hydraulic device to provide a static seal between two components of the hydraulic device that do not move relative to each other. The annular seal may have a cross section that is substantially M-shaped along one of an inner diameter circumferential surface or an outer diameter circumferential surface, and the other of the inner diameter circumferential surface or the outer diameter circumferential surface of the annular seal may include opposite side cylindrical portions extending substantially parallel to a central axis of the annular seal with an annular concave central portion disposed between the opposite side cylindrical portions.

In another aspect, the present disclosure is directed to an annular seal for use in a hydraulic device to provide a static seal between two components of the hydraulic device that do not move relative to each other, the annular seal including a central axis, an inner diameter circumferential surface, an outer diameter circumferential surface, and two opposite side surfaces interconnecting the inner diameter circumferential surface and the outer diameter circumferential surface. One of the inner diameter circumferential surface or the outer diameter circumferential surface may include two laterally spaced peaks across a width of the annular seal in a direction parallel to the central axis of the annular seal. The other of the inner diameter circumferential surface or the outer diameter circumferential surface may include opposite side cylindrical portions extending substantially parallel to the central axis of the annular seal with an annular concave central portion disposed between the opposite side cylindrical portions.

In yet another aspect, the present disclosure is directed to an annular seal for use in a hydraulic device, the annular seal including a central axis, an inner diameter circumferential surface, and an outer diameter circumferential surface. One of the inner diameter circumferential surface or the outer diameter circumferential surface may include an undulating axial profile with two annular peaks spaced equidistant from opposite lateral side surfaces of the annular seal in a direction parallel to the central axis of the annular seal. The other of the inner diameter circumferential surface or the outer diameter circumferential surface may include opposite side cylindrical portions extending substantially parallel to the central axis of the annular seal with an annular concave central portion disposed between the opposite side cylindrical portions.

DETAILED DESCRIPTION

Figure 1:
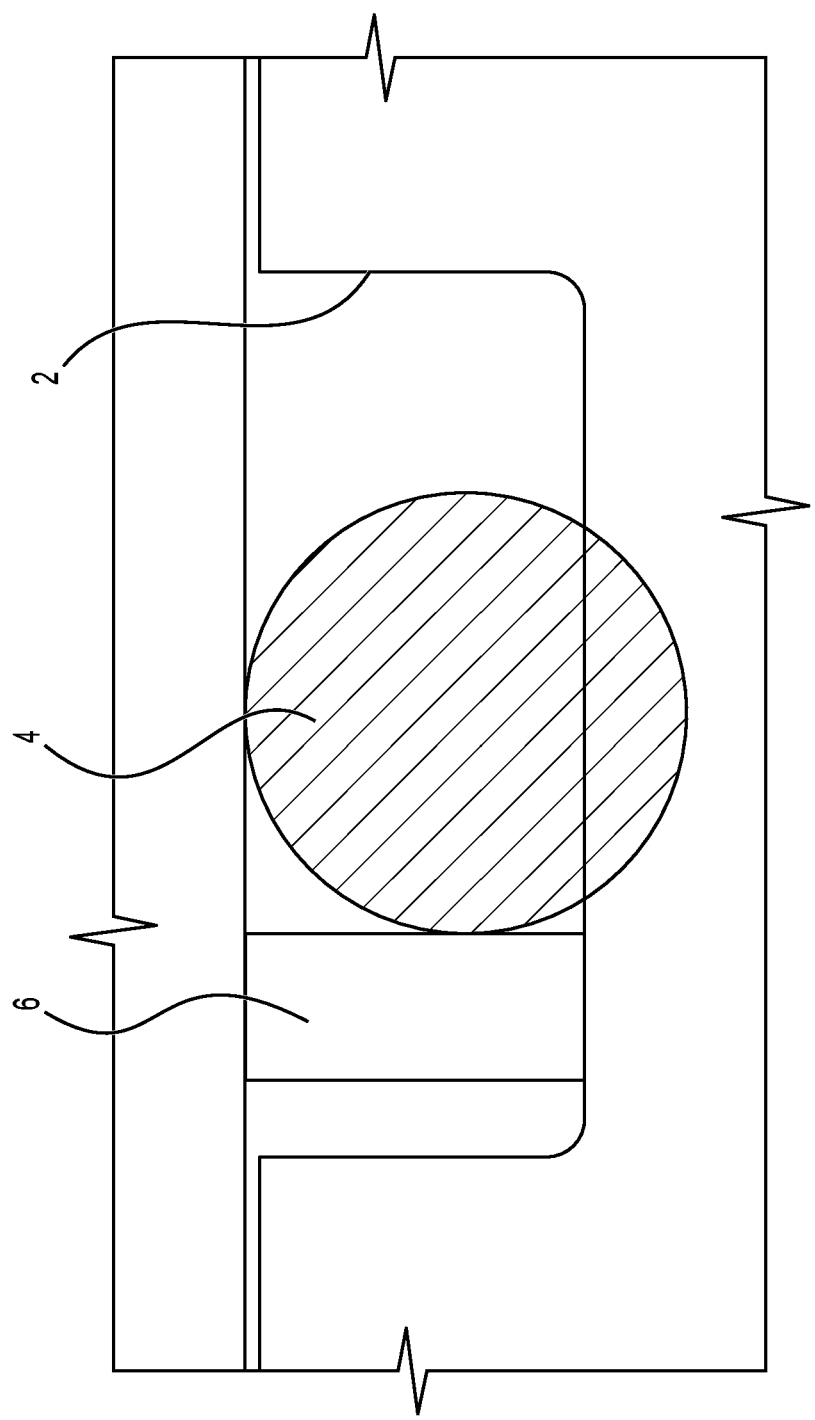
FIG. 1 is a partial cross-sectional view of a conventional O-ring and backup ring in an uncompressed state relative to an external annular groove of a hydraulic cylinder component.

Referring to the drawings, FIG. 1 shows a conventional sealing arrangement between components of a hydraulic cylinder, including a backup ring (BUR) 6 and an O-ring 4 disposed in a groove 2. While such a conventional sealing arrangement has worked well in many applications, assembly of a hydraulic cylinder with such an arrangement of annular seals in one or more grooves is complicated enough that there may be problems caused by errors during the assembly process, wherein pinching or misplacement of one or both seals may eventually result in either the BUR or the O-ring at least partially extruding from the annular groove and/or getting pinched between the parts being sealed during assembly, thus leading to a defective seal.

Figure 2:
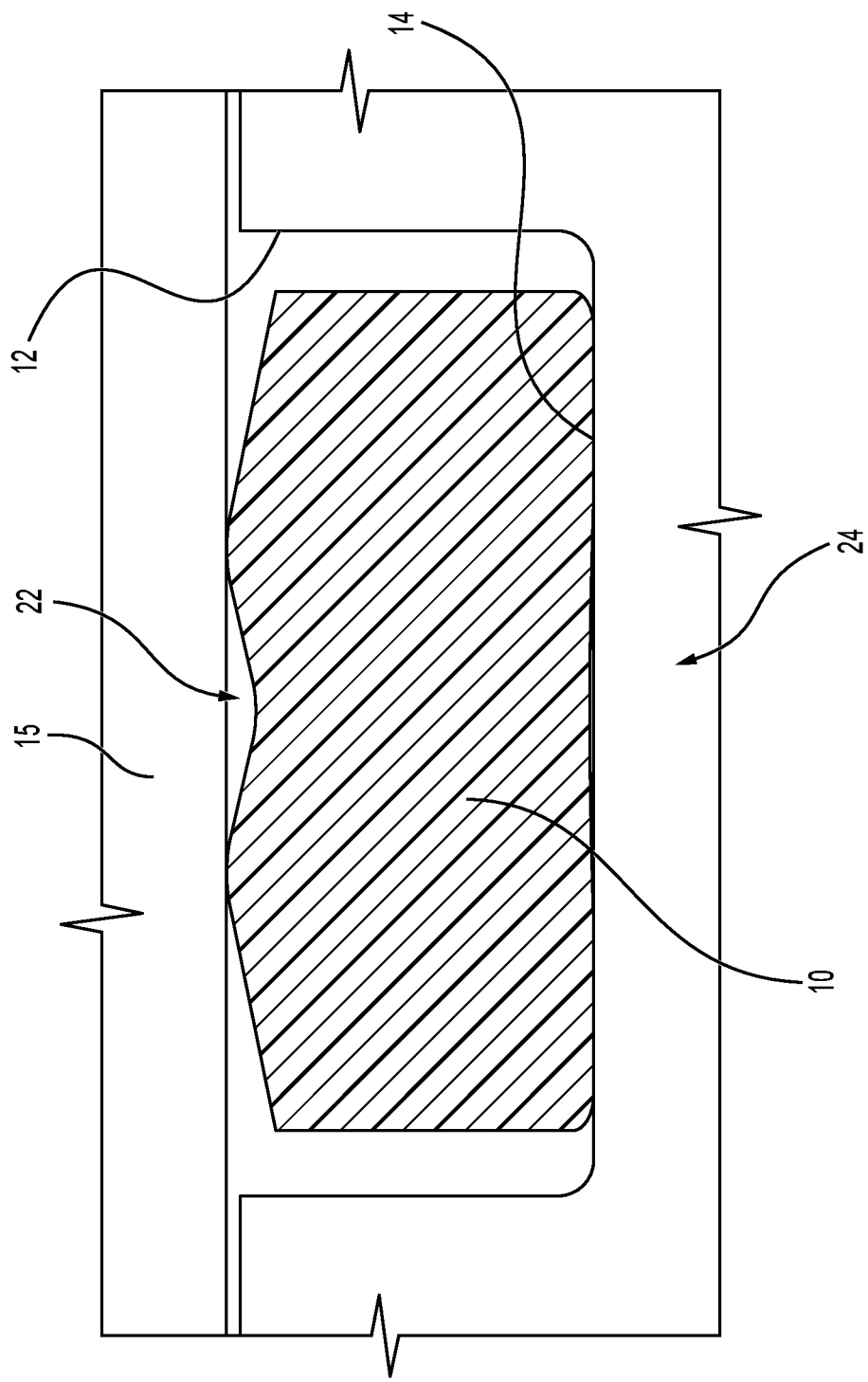
FIG. 2 is a cross-sectional view of an annular seal in a compressed state seated in an external annular groove of a hydraulic cylinder component according to an embodiment of the present disclosure.

FIG. 2 is a cross-sectional view of an annular seal 10 in a compressed state seated in an external annular groove 12 of a hydraulic cylinder component and sealing against an inner circumferential surface of a mating part 15, according to an embodiment of the present disclosure. The embodiment of an annular seal 10 shown in FIG. 2 may be referred to as an external dual-peak annular seal. The exemplary external dual-peak annular seal is an example of an annular seal according to embodiments of this disclosure that is configured for use in a hydraulic cylinder to provide a static seal between two components of the hydraulic cylinder that do not move relative to each other. The annular seal 10 according to various embodiments of this disclosure may have a cross-section that is substantially M-shaped along one of an inner diameter circumferential surface 24 of the annular seal 10 (an internal dual-peak annular seal) or an outer diameter circumferential surface 22 of the annular seal 10 (an external dual-peak annular seal). In the exemplary embodiment of an external dual-peak annular seal shown in FIG. 2, the outer diameter circumferential surface 22 of the annular seal 10 has a substantially M-shaped cross-section. The other of the inner diameter circumferential surface or the outer diameter circumferential surface of an annular seal according to various embodiments of this disclosure may include opposite side cylindrical portions extending substantially parallel to a central axis of the annular seal with an annular concave central portion disposed between the opposite side cylindrical portions. In the exemplary embodiment of FIG. 2, the inner diameter circumferential surface 24 of the annular seal 10 rests against the bottom surface 14 of the external annular groove 12 along the opposite side cylindrical portions that extend substantially parallel to the central axis of the annular seal. Throughout this specification, terms beginning with "substantially," such as "substantially M-shaped cross-section" and "substantially parallel" mean that the tolerances are within standard engineering, machining, molding, forming, or assembling tolerances for parts made of similar materials.

Figure 3:
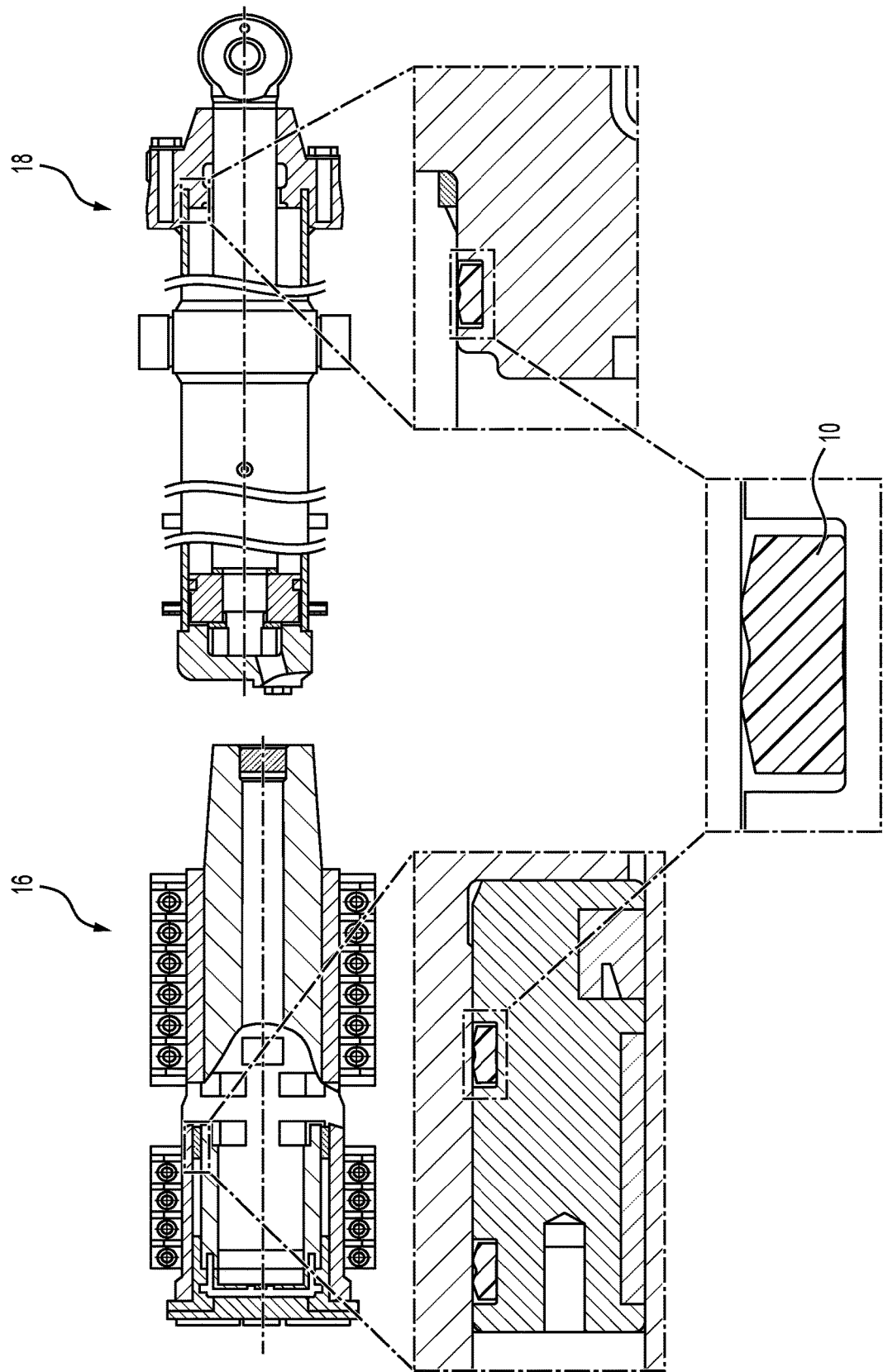
FIG. 3 is a cross-sectional view illustrating sealing arrangements using an annular seal as shown in FIG. 2 for a static suspension seal (16) and for a static cylinder head seal (18) of a hydraulic cylinder.

FIG. 3 is a cross-sectional view illustrating sealing arrangements using an annular seal 10 as shown in FIG. 2 for a static suspension seal (16) and for a static cylinder head seal (18) of a hydraulic cylinder. Other applications for an annular seal according to various embodiments of this disclosure may include static seals between other hydraulic cylinder components on other hydraulic devices, wherein the components do not move relative to each other.

Figure 4:
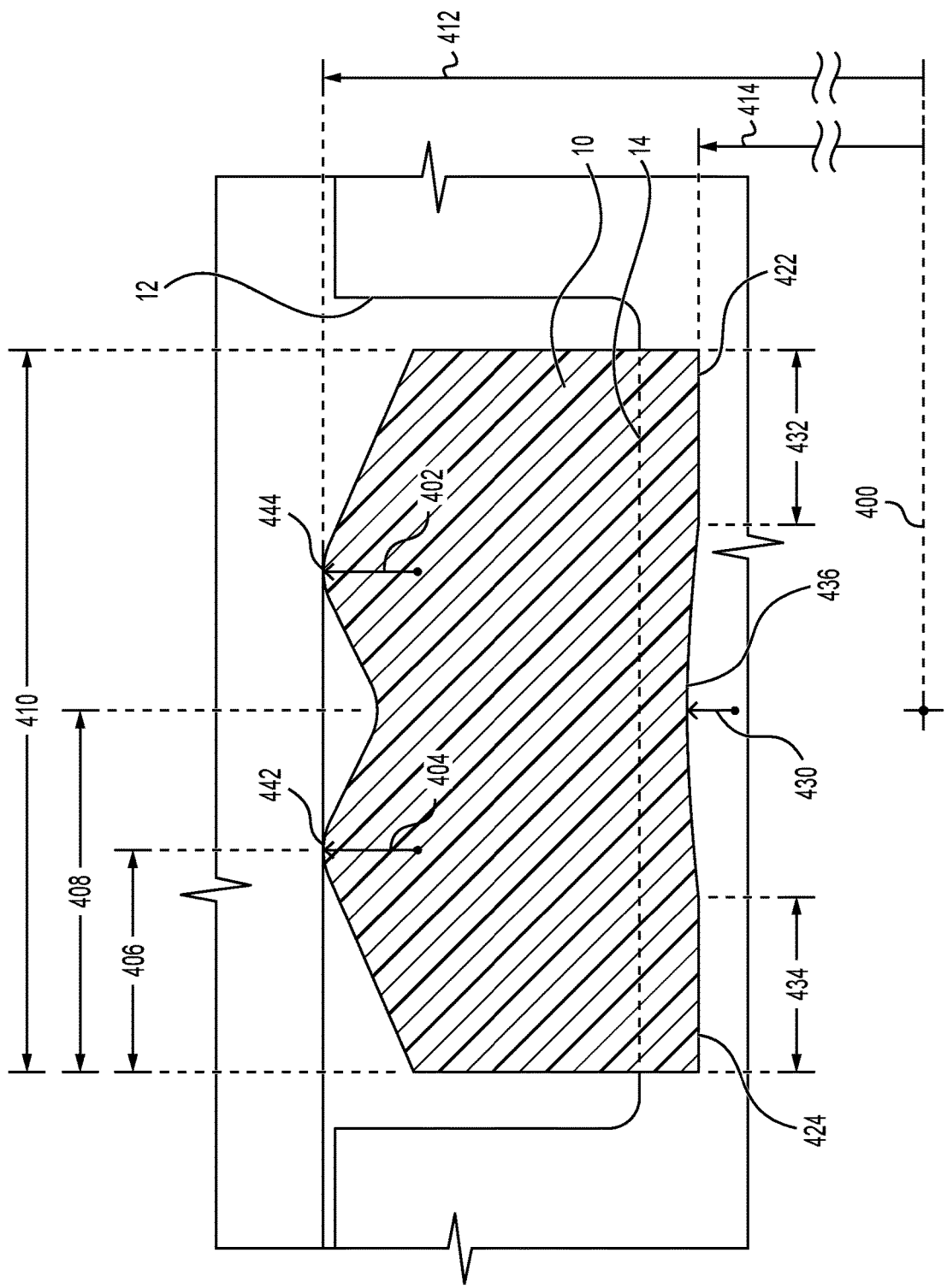
FIG. 4 is a cross-sectional view of the annular seal of FIG. 2 in an uncompressed state relative to an external annular groove of a hydraulic cylinder component.

As shown in FIG. 4, an external dual-peak annular seal 10 according to an exemplary embodiment of this disclosure may include an outer diameter circumferential surface 22 (see FIG. 2) that forms the outer boundary of a substantially M-shaped cross-section. The outer diameter circumferential surface 22 may include two laterally spaced peaks 442, 444, and the pinnacle of each of the peaks 442, 444 may be disposed at a distance 406 that falls within a range from approximately 20% to 35% of the total width 410 of the annular seal 10 from the closest lateral side of the annular seal along a direction parallel to the central axis 400 of the annular seal. The radius 402, 404 of each of the peaks 444, 442 may fall within a range from approximately 0.2 mm to 3.0 mm.

As also shown in FIG. 4, an annular seal 10 according to an exemplary embodiment of this disclosure may be configured such that the inner diameter circumferential surface 24 (see FIG. 2) includes opposite side cylindrical portions 422, 424, which extend substantially parallel to a central axis 400 of the annular seal, and which each have a width 432, 434 in a direction parallel to the central axis 400 of the annular seal 10 that falls within a range from approximately 20% to 35% of the total width 410 of the annular seal 10. An annular concave central portion 436 may be defined in between the opposite side cylindrical portions 422, 424, and the annular concave central portion 436 may have a radius 430 in a plane parallel to the central axis 400 of the annular seal that falls within a range from approximately 5 mm to approximately 30 mm. The concave central portion 436 may be centered at one-half 408 of the total width 410 of the annular seal 10, and may reduce the amount of material on the inner diameter circumferential surface 24 that actually presses against the bottom surface 14 of the annular groove 12 when the annular seal 10 is in a compressed state in the annular groove 12, thereby increasing the stability of the annular seal 10 in the annular groove 12 as a result of the greater compressive force exerted against the opposite side cylindrical portions 422, 424. The concave central portion 436 in the exemplary embodiment shown in FIG. 4 ensures that the compressive stresses exerted on the annular seal 10 when it is installed in the annular groove 12 are greater at the opposite sides of the annular seal 10, thus stabilizing the annular seal in the annular groove and preventing the annular seal from rotating or becoming misaligned in the annular groove when exposed to pressure from one or both sides of the annular seal.

A radius 414 of the inner diameter circumferential surface 24 of the annular seal 10 may fall within a range from approximately 50 mm to approximately 250 mm (measured from the central axis 400 of the annular seal 10 to the opposite side cylindrical portions 422, 424). A radius 412 of the outer diameter circumferential surface of the annular seal may fall within a range from approximately 52 mm to approximately 260 mm (measured from the central axis 400 of the annular seal 10 to the pinnacles of the peaks 442, 444).

Figure 5:
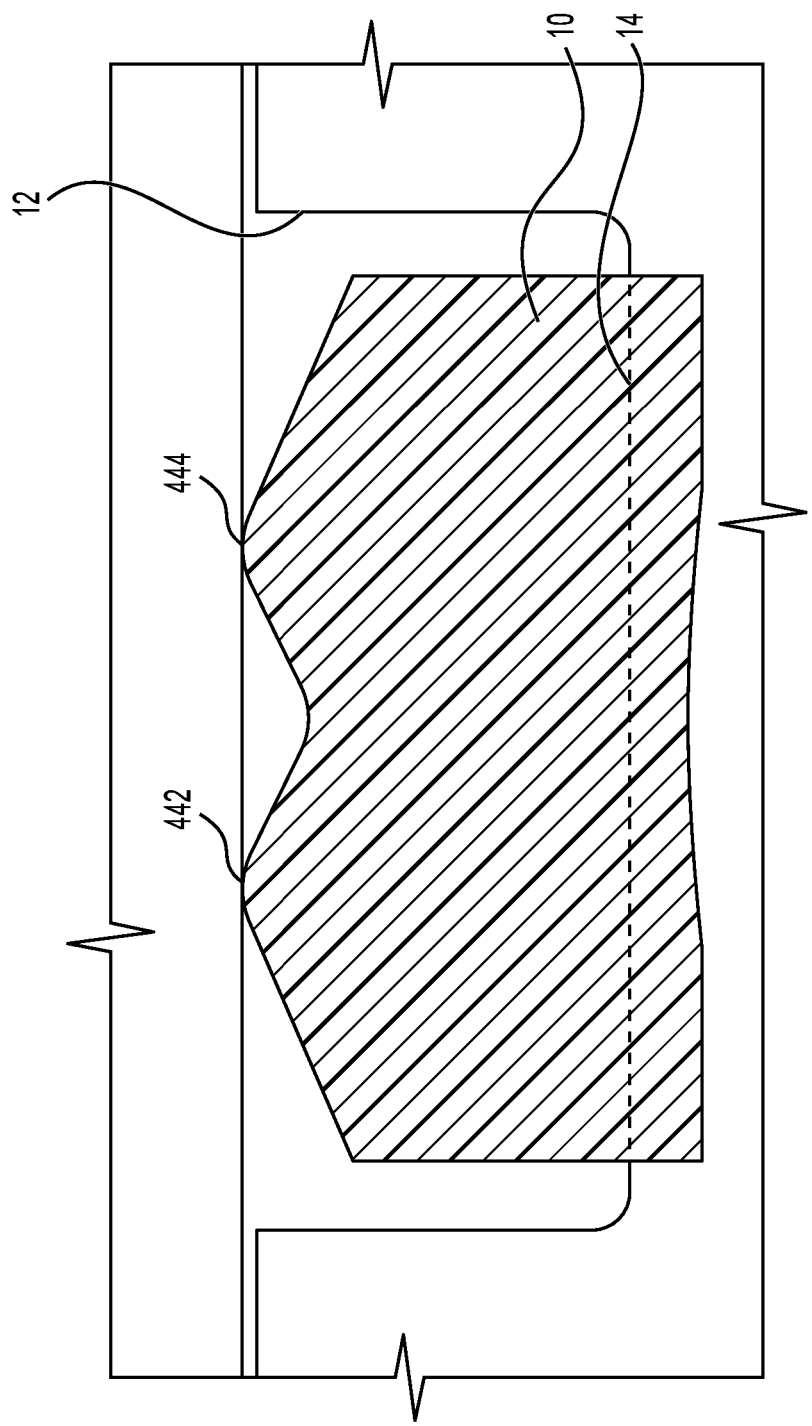
FIG. 5 illustrates a cross-sectional view of the annular seal of FIG. 2 in an uncompressed state relative to an external annular groove of a hydraulic device component.
Figure 6:
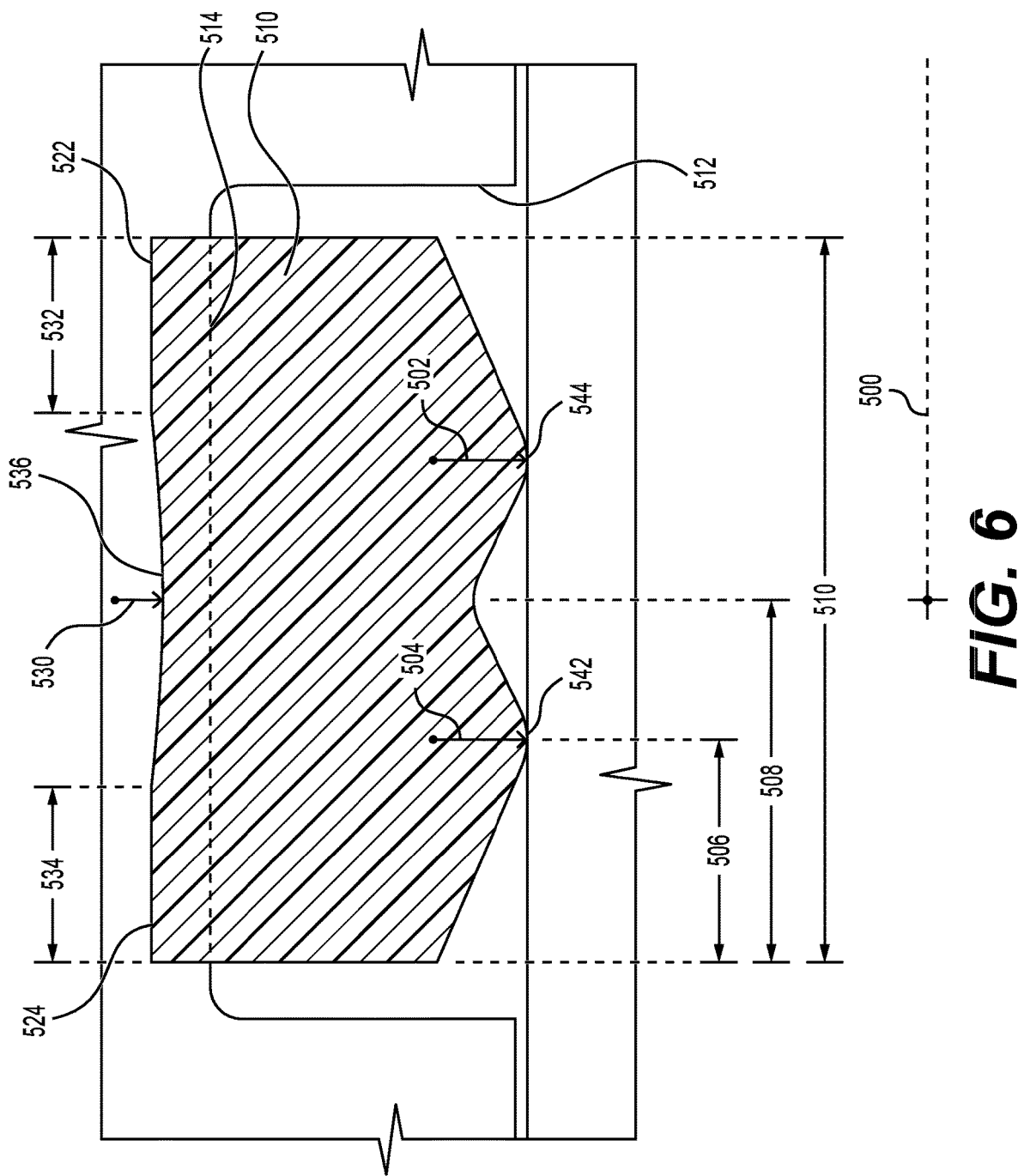
FIG. 6 illustrates a cross-sectional view of another embodiment of an annular seal in an uncompressed state relative to an internal annular groove of a hydraulic device component (bottom portion of FIG. 5).

An alternative embodiment 510 of the external dual-peak annular seal 10 shown in FIGS. 2, 4, and 5 is shown in FIG. 6. The alternative embodiment 510 of an internal dual-peak annular seal is configured for seating in an internal annular groove 512, rather than an external annular groove, and is configured for providing a sealing engagement against an outer circumferential surface of a mating, stationary component of a hydraulic device rather than a sealing engagement against an inner circumferential surface of a mating, stationary component of a hydraulic device.

As shown in FIG. 6, the alternative embodiment 510 of an internal dual-peak annular seal may include an inner diameter circumferential surface that forms an inner boundary of a substantially M-shaped cross-section. The inner diameter circumferential surface may include two laterally spaced peaks 542, 544, and the pinnacle of each of the peaks 542, 544 may be disposed at a distance 506 that falls within a range from approximately 20% to 35% of the total width 510 of the annular seal from the closest lateral side of the annular seal along a direction parallel to the central axis of the annular seal. The radius 502, 504 of each of the peaks 544, 542 may fall within a range from approximately 0.2 mm to 3.0 mm.

As also shown in the alternative embodiment of FIG. 6, the annular seal may be configured such that the outer diameter circumferential surface includes opposite side cylindrical portions 522, 524, which extend substantially parallel to a central axis 500 of the annular seal, and each have a width 532, 534 in a direction parallel to the central axis 500 of the annular seal that falls within a range from approximately 20% to 35% of the total width 510 of the annular seal. A concave central portion 536 may be defined in between the opposite side cylindrical portions 522, 524, and the concave central portion 536 may have a radius 530 in a plane parallel to the central axis 500 of the annular seal that falls within a range from approximately 5 mm to approximately 30 mm. The concave central portion 536 may be centered at one-half 508 of the total width 510 of the annular seal, and may reduce the amount of material on the outer diameter circumferential surface that actually presses against the bottom surface 514 of the external annular groove 512 when the annular seal is in a compressed state in the annular groove 512, thereby increasing the stability of the annular seal in the annular groove 512 as a result of the greater compressive force exerted against the opposite side cylindrical portions 522, 524. The concave central portion 536 in the exemplary embodiment shown in FIG. 6 ensures the compressive stresses exerted on the annular seal when it is installed in the external annular groove 512 are greater at the opposite sides of the annular seal, thus preventing the annular seal from rotating or becoming misaligned in the annular groove when exposed to pressure from one or both sides of the annular seal.

A radius of the inner diameter circumferential surface of the alternative internal dual-peak annular seal may fall within a range from approximately 50 mm to approximately 250 mm (measured from the central axis of the annular seal to the pinnacles of the peaks 542, 544). A radius of the outer diameter circumferential surface of the alternative internal dual-peak annular seal may fall within a range from approximately 52 mm to approximately 260 mm (measured from the central axis of the annular seal to the opposite side cylindrical portions 522, 524).

INDUSTRIAL APPLICABILITY

The present disclosure is directed to an annular seal for use as a static seal between two components of a hydraulic device that do not move relative to each other. The annular seal may include a central axis, an inner diameter circumferential surface, and an outer diameter circumferential surface. One of the inner diameter circumferential surface or the outer diameter circumferential surface may include an undulating axial profile with two annular peaks spaced equidistance from opposite lateral side surfaces of the annular seal in a direction parallel to the central axis of the annular seal. The other of the inner diameter circumferential surface or the outer diameter circumferential surface may include opposite side cylindrical portions extending substantially parallel to the central axis of the annular seal with a concave central portion disposed between the opposite side cylindrical portions.

In an embodiment of the present disclosure that may be referred to as an external dual-peak annular seal, the outer diameter circumferential surface of the annular seal may be configured with an undulating profile with two annular peaks, and the inner diameter circumferential surface of the annular seal may be configured with opposite side cylindrical portions extending substantially parallel to the central axis of the annular seal with a concave central portion disposed between the opposite side cylindrical portions. The external dual-peak annular seal may be configured to seat in an external annular groove of one component of a hydraulic device and provide a sealing engagement against an inner circumferential surface of a mating component of the hydraulic device. In an embodiment of the present disclosure that may be referred to as an internal dual-peak annular seal, the inner diameter circumferential surface of the annular seal may be configured with an undulating profile with two annular peaks, and the outer diameter circumferential surface of the annular seal may be configured with opposite side cylindrical portions extending substantially parallel to the central axis of the annular seal with a concave central portion disposed between the opposite side cylindrical portions. The internal dual-peak annular seal may be configured to seat in an internal annular groove of one component of a hydraulic device and provide a sealing engagement against an external circumferential surface of a mating component of the hydraulic device. In either of the above-described embodiments of a dual-peak annular seal according to this disclosure, the annular seal may be configured to seat securely in an annular groove, with the opposite side cylindrical portions on either the inner diameter circumferential surface or the outer diameter circumferential surface of the annular seal seating on the bottom of the annular groove and with a concave central portion in between the opposite side cylindrical portions raised off of the bottom of the groove, ensuring that more stress is exerted against the opposite sides and outside corners of the annular seal to provide a more secure seat of the seal in the groove and to prevent rotation of the annular seal in the annular groove.

The above-disclosed annular seals may be incorporated into a sealing assembly of any hydraulic device. Thus, the annular seals of the present disclosure have wide applications in a variety of machines that include hydraulic actuators, hydraulic cylinders, suspension systems, etc. Some of the advantages of the disclosed embodiments include providing a robust static sealing system that is simple to install, with the dual peaks providing multiple barrier contaminant controls, higher resistance to the potentially detrimental effects of temperature, moisture, and pressure in a hydraulic actuator, stability of the annular seal in an annular groove under pressure from either side of the annular seal, fewer machine stoppages for servicing hydraulic cylinders, longer life of the hydraulic cylinder components, and extended oil life for the hydraulic cylinders as a result of avoidance of penetration of contaminants into the hydraulic cylinders or leakage of hydraulic fluid from the hydraulic cylinders.

It will be apparent to those skilled in the art that various modifications and variations can be made in the disclosed dual-peak annular seals without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. An annular seal for use in a hydraulic device to provide a static seal between two components of the hydraulic device, the annular seal comprising:
    a cross section that is symmetrical and substantially M-shaped along one of an inner diameter circumferential surface of the annular seal or an outer diameter circumferential surface of the annular seal; and
    the other of the inner diameter circumferential surface or the outer diameter circumferential surface of the annular seal includes:
        opposite side cylindrical portions extending substantially parallel to a central axis of the annular seal, and
        an annular concave central portion between the opposite side cylindrical portions,
    wherein the substantially M-shaped cross section includes two laterally spaced peaks separated by a valley, and
    wherein a maximum depth of the annular concave central portion is less than a maximum depth of the valley of the substantially M-shaped cross section.

2. The annular seal of claim 1, wherein the pinnacle of each of the peaks is disposed at a distance that falls within a range from approximately 20% to 35% of the total width of the annular seal from the closest lateral side of the annular seal along a direction parallel to the central axis of the annular seal.

3. The annular seal of claim 1, wherein each of the opposite side cylindrical portions has a width in a direction parallel to the central axis of the annular seal that falls within a range from approximately 20% to 35% of the total width of the annular seal.

4. The annular seal of claim 1, wherein the cross section that is symmetrical and substantially M-shaped is along the outer diameter circumferential surface of the annular seal; and
    the inner diameter circumferential surface of the annular seal includes the opposite side cylindrical portions extending substantially parallel to the central axis of the annular seal with the annular concave central portion between the opposite side cylindrical portions.

5. The annular seal of claim 4, wherein the symmetrical and substantially M-shaped cross section includes two laterally spaced peaks and the pinnacle of each of the peaks is disposed at a distance that falls within a range from approximately 20% to approximately 35% of the total width of the annular seal from the closest lateral side of the annular seal along a direction parallel to the central axis of the annular seal.

6. The annular seal of claim 4, wherein each of the opposite side cylindrical portions has a width in a direction parallel to the central axis of the annular seal that falls within a range from approximately 20% to approximately 35% of the total width of the annular seal.

7. The annular seal of claim 1, wherein the inner diameter circumferential surface of the annular seal has a diameter that falls within a range from approximately 100 mm to approximately 500 mm, and the outer diameter circumferential surface of the annular seal has a diameter that falls within a range from approximately 104 mm to approximately 520 mm.

8. The annular seal of claim 1, wherein the annular concave central portion has a radius that falls within a range from approximately 5 mm to approximately 30 mm.

9. The annular seal of claim 1, wherein the symmetrical and substantially M-shaped cross section includes the two laterally spaced peaks, and the radius of each of the peaks falls within a range from approximately 0.2 mm to 3.0 mm.

10. An annular seal for use in a hydraulic device to provide a static seal between two components of the hydraulic device, the annular seal comprising:
    a central axis,
    an inner diameter circumferential surface,
    an outer diameter circumferential surface, and
    two opposite side surfaces interconnecting the inner diameter circumferential surface and the outer diameter circumferential surface,
    wherein one of the inner diameter circumferential surface or the outer diameter circumferential surface includes two laterally spaced peaks across a width of the annular seal in a direction parallel to the central axis of the annular seal,
    wherein the other of the inner diameter circumferential surface or the outer diameter circumferential surface includes:
        opposite side cylindrical portions extending substantially parallel to the central axis of the annular seal, and
        an annular concave central portion between the opposite side cylindrical portions,
    wherein the two laterally spaced peaks are inward of the two opposite side surfaces in the direction parallel to the central axis of the annular seal, and
    wherein each of the two opposite side surfaces extends straight from the inner diameter circumferential surface to the outer diameter circumferential surface in a direction perpendicular to the central axis of the annular seal.

11. The annular seal of claim 10, wherein the pinnacle of each of the peaks is disposed at a distance that falls within a range from approximately 20% to 35% of the total width of the annular seal from the closest lateral side of the annular seal along the direction parallel to the central axis of the annular seal.

12. The annular seal of claim 10, wherein each of the opposite side cylindrical portions has a width in the direction parallel to the central axis of the annular seal that falls within a range from approximately 20% to 35% of the total width of the annular seal.

13. The annular seal of claim 10, wherein the two laterally spaced peaks across a width of the annular seal in the direction parallel to the central axis of the annular seal are disposed on the outer diameter circumferential surface of the annular seal; and
the inner diameter circumferential surface of the annular seal includes;
opposite side cylindrical portions extending substantially parallel to the central axis of the annular seal, and
an annular concave central portion between the opposite side cylindrical portions.

14. The annular seal of claim 13, wherein the pinnacle of each of the peaks is disposed at a distance that falls within a range from approximately 20% to 35% of the total width of the annular seal from the closest lateral side of the annular seal along the direction parallel to the central axis of the annular seal.

15. The annular seal of claim 13, wherein each of the opposite side cylindrical portions has a width in the direction parallel to the central axis of the annular seal that falls within a range from approximately 20% to 35% of the total width of the annular seal.

16. The annular seal of claim 10, wherein the inner diameter circumferential surface of the annular seal has a diameter that falls within a range from approximately 100 mm to approximately 500 mm, and the outer diameter circumferential surface of the annular seal has a diameter that falls within a range from approximately 104 mm to approximately 520 mm.

17. The annular seal of claim 10, wherein the annular concave central portion has a radius that falls within a range from approximately 5 mm to approximately 30 mm.

18. The annular seal of claim 10, wherein the radius of each of the peaks falls within a range from approximately 0.2 mm to 3.0 mm.

19. An annular seal for use in a hydraulic device, the annular seal comprising:
a central axis,
an inner diameter circumferential surface,
an outer diameter circumferential surface, and
two opposite side surfaces interconnecting the inner diameter circumferential surface and the outer diameter circumferential surface,
wherein one of the inner diameter circumferential surface or the outer diameter circumferential surface includes an undulating axial profile with two annular peaks spaced equidistance from opposite lateral side surfaces of the annular seal in a direction parallel to the central axis of the annular seal,
wherein the other of the inner diameter circumferential surface or the outer diameter circumferential surface includes:
opposite side cylindrical portions extending substantially parallel to the central axis of the annular seal, and
an annular concave central portion between the opposite side cylindrical portions,
wherein a maximum depth of the annular concave central portion is less than a maximum depth of the undulating axial profile with two annular peaks, and
wherein each of the two opposite side surfaces extends straight from the inner diameter circumferential surface to the outer diameter circumferential surface in a direction perpendicular to the central axis of the annular seal.

20. The annular seal of claim 19, wherein the outer diameter circumferential surface of the annular seal is configured with the undulating axial profile with two annular peaks; and
the inner diameter circumferential surface of the annular seal is configured with the opposite side cylindrical portions extending substantially parallel to the central axis of the annular seal and the annular concave central portion between the opposite side cylindrical portions.

* * * * *